United States Patent
Chen et al.

(10) Patent No.: US 11,308,893 B2
(45) Date of Patent: Apr. 19, 2022

(54) METHOD FOR CONTROLLING BRIGHTNESS IN MOBILE TERMINAL DISPLAY, MOBILE TERMINAL AND STORAGE DEVICE

(71) Applicant: JRD Communication (Shenzhen) LTD., Shenzhen (CN)

(72) Inventors: Yanwen Chen, Shenzhen (CN); Yan Liu, Shenzhen (CN); Lanying He, Shenzhen (CN); Xiaobin Zhai, Shenzhen (CN); Junting Liu, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 121 days.

(21) Appl. No.: 16/636,929

(22) PCT Filed: Aug. 8, 2018

(86) PCT No.: PCT/CN2018/099374
§ 371 (c)(1),
(2) Date: Feb. 6, 2020

(87) PCT Pub. No.: WO2019/029564
PCT Pub. Date: Feb. 14, 2019

(65) Prior Publication Data
US 2020/0168166 A1 May 28, 2020

(30) Foreign Application Priority Data
Aug. 8, 2017 (CN) .......................... 201710670626.7

(51) Int. Cl.
*G09G 3/30* (2006.01)
*G09G 3/34* (2006.01)
(Continued)

(52) U.S. Cl.
CPC ......... *G09G 3/3406* (2013.01); *G06F 3/0346* (2013.01); *G06F 3/0481* (2013.01);
(Continued)

(58) Field of Classification Search
CPC .. G09G 3/3406; G09G 5/10; G09G 2320/064; G09G 2360/144;
(Continued)

(56) References Cited

U.S. PATENT DOCUMENTS

| 9,767,599 | B2 * | 9/2017 | Lamy | ...................... G06T 15/50 |
| 2015/0262548 | A1 | 9/2015 | Lin | |
| 2015/0269907 | A1 * | 9/2015 | Hadas | ...................... G09G 5/10 |
| | | | | 345/589 |

FOREIGN PATENT DOCUMENTS

| CN | 103137100 | 6/2013 |
| CN | 105812577 | 7/2016 |

(Continued)

OTHER PUBLICATIONS

International Search Report and the Written Opinion dated Nov. 1, 2018 From the International Searching Authority Re. Application No. PCT/CN2018/099374 and Its Translation of Search Report Into English. (9 Pages).

*Primary Examiner* — Adam R. Giesy (57) ABSTRACT

Disclosed by the present application are a method for controlling brightness in mobile terminal display, a mobile terminal and a storage device, the method comprising: controlling an optical sensor and an acceleration sensor within a mobile terminal to respectively monitor in real time a change value for environmental brightness and a change value for angle of rotation; determining whether the change value for environmental brightness and the change value for angle of rotation as monitored by the mobile terminal are less than a preset brightness and a preset angle, respectively;

(Continued)

and when yes, controlling the brightness in mobile terminal display to not change.

17 Claims, 3 Drawing Sheets

(51) Int. Cl.
    *G06F 3/0346*     (2013.01)
    *G06F 3/0481*     (2022.01)
    *G09G 5/10*     (2006.01)

(52) U.S. Cl.
    CPC .......... *G09G 5/10* (2013.01); *G09G 2320/064* (2013.01); *G09G 2360/144* (2013.01)

(58) Field of Classification Search
    CPC ............. G09G 2320/0247; G09G 3/20; G09G 2320/0626; G06F 3/0346; G06F 3/0481; G06F 1/3265; G06F 1/3206; G06F 1/1694; Y02D 10/00
    See application file for complete search history.

(56) References Cited

FOREIGN PATENT DOCUMENTS

| | | |
|---|---|---|
| CN | 105825839 | 8/2016 |
| CN | 107562306 | 1/2018 |
| WO | WO 2019/029564 | 2/2019 |

\* cited by examiner

METHOD FOR CONTROLLING BRIGHTNESS IN MOBILE TERMINAL DISPLAY, MOBILE TERMINAL AND STORAGE DEVICE

RELATED APPLICATIONS

This application is a National Phase of PCT Patent Application No. PCT/CN2018/099374 having International filing date of Aug. 8, 2018, which claims the priority of Chinese Patent Application No. 201710670626.7, filed on Aug. 8, 2017. The contents of the above applications are all incorporated by reference as if fully set forth herein in their entirety.

FIELD AND BACKGROUND OF THE INVENTION

The present disclosure relates to the field of mobile terminal application technology, more particularly, to a method for controlling display brightness of a mobile terminal, a mobile terminal and a storage device.

With the popularization of mobile terminals (such as smart phones), users pay more attention to the experiences and feelings for details. How to achieve excellence in user experience is a top priority for each smart terminal manufacturer. Take a mobile phone as an example. In order to prevent the user from manually adjusting the display brightness of the mobile phone to match the ambient light, an L-sensor (light sensor) is introduced in the related art to adaptively adjust the display brightness of the mobile phone based on different ambient light. However, in the environment of multiple point light sources (non-uniform surface light source), the L-sensor will continuously respond and adjust the display brightness of the mobile phone based on the ambient brightness sensed at different angles when the user holds the mobile phone at different angles, which causes inconveniences to the user when the user views the mobile phone.

Therefore, there is a need to provide a method for controlling display brightness of a mobile terminal, a mobile terminal and a storage device to improve the related art.

SUMMARY OF THE INVENTION

The embodiment according to the present disclosure provides a method for controlling display brightness of a mobile terminal, a mobile terminal and a storage device. By combining the light sensor and the acceleration sensor, the display brightness of the mobile terminal can be controlled. The problem that the mobile terminal adjusts the display brightness in real time caused by a misoperation is avoided to improve the intelligence of brightness adjustment of the mobile terminal.

One aspect of the embodiment of the present disclosure provides a method for controlling display brightness of a mobile terminal. The method comprises:

controlling a light sensor and an acceleration sensor in the mobile terminal in advance to respectively monitor an ambient brightness change value and a rotation angle change value in real time;

determining whether or not the ambient brightness change value and the rotation angle change value monitored by the mobile terminal are respectively smaller than a preset brightness and a preset angle; and controlling the display brightness of the mobile terminal unchanged when both the ambient brightness change value and the rotation angle change value are respectively smaller than the preset brightness and the preset angle.

According to the method, before the step of controlling the light sensor and the acceleration sensor in the mobile terminal in advance to respectively monitor the ambient brightness change value and the rotation angle change value in real time the method further comprises:

setting a brightness adjustment state to automatically adjusting the display brightness through the mobile terminal.

According to the method, after the step of determining whether or not the ambient brightness change value and the rotation angle change value monitored by the mobile terminal are respectively smaller than the preset brightness and the preset angle the method further comprises:

controlling the mobile terminal to automatically adjust the display brightness when both the ambient brightness change value and the rotation angle change value are respectively greater than or equal to the preset brightness and the preset angle.

According to the method, the preset brightness is 200 $cd/m^2$.

According to the method, the preset angle is 40 degrees.

According to the method, the step of controlling the light sensor and the acceleration sensor in the mobile terminal in advance to respectively monitor the ambient brightness change value and the rotation angle change value in real time further comprises:

turning on the light sensor in the mobile terminal to monitor ambient brightness in real time, and turning on the acceleration sensor to monitor a rotation angle in real time at the same time;

respectively monitoring the ambient brightness and the rotation angle after a position of the mobile terminal is changed through the light sensor and the acceleration sensor after the position of the mobile terminal is changed; and calculating the ambient brightness change value and the rotation angle change value of the mobile terminal by the mobile terminal based on the ambient brightness and the rotation angle after the position is changed.

According to the method, the step of determining whether or not the ambient brightness change value and the rotation angle change value monitored by the mobile terminal are respectively smaller than the preset brightness and the preset angle further comprises:

setting the preset brightness and the preset angle through the mobile terminal in advance; and determining whether or not the ambient brightness change value monitored by the light sensor is smaller than the preset brightness, and determining whether or not the rotation angle change value monitored by the acceleration sensor is smaller than the preset angle at the same time.

According to the method, the step of controlling the display brightness of the mobile terminal unchanged when both the ambient brightness change value and the rotation angle change value are respectively smaller than the preset brightness and the preset angle further comprises:

sending an instruction for prohibiting brightness adjustment to a background of the mobile terminal when the mobile terminal determines that the ambient brightness change value is smaller than the preset brightness and the rotation angle change value is smaller than the preset angle; and controlling the display brightness of the mobile terminal unchanged by the background of the mobile terminal according to the received instruction for prohibiting brightness adjustment.

Another aspect of the embodiment of the present disclosure provides a mobile terminal. The mobile terminal comprises a processor, a memory communicatively connected to the processor. The memory stores a computer program. The processor is configured to call the computer program in the memory to implement the operations of:

controlling a light sensor and an acceleration sensor in the mobile terminal in advance to respectively monitor an ambient brightness change value and a rotation angle change value in real time;

determining whether or not the ambient brightness change value and the rotation angle change value monitored by the mobile terminal are respectively smaller than a preset brightness and a preset angle;

controlling the display brightness of the mobile terminal unchanged when both the ambient brightness change value and the rotation angle change value are respectively smaller than the preset brightness and the preset angle; and controlling the mobile terminal to automatically adjust the display brightness when both the ambient brightness change value and the rotation angle change value are respectively greater than or equal to the preset brightness and the preset angle.

In the mobile terminal, before the operation of controlling the light sensor and the acceleration sensor in the mobile terminal in advance to respectively monitor the ambient brightness change value and the rotation angle change value in real time the operations further comprises:

setting a brightness adjustment state to automatically adjusting the display brightness through the mobile terminal.

In the mobile terminal, the preset brightness is 200 cd/m$^2$.

In the mobile terminal, the preset angle is 40 degrees.

In the mobile terminal, the operation of controlling the light sensor and the acceleration sensor in the mobile terminal in advance to respectively monitor the ambient brightness change value and the rotation angle change value in real time further comprises:

turning on the light sensor in the mobile terminal to monitor ambient brightness in real time, and turning on the acceleration sensor to monitor a rotation angle in real time at the same time;

respectively monitoring the ambient brightness and the rotation angle after a position of the mobile terminal is changed through the light sensor and the acceleration sensor after the position of the mobile terminal is changed; and calculating the ambient brightness change value and the rotation angle change value of the mobile terminal by the mobile terminal based on the ambient brightness and the rotation angle after the position is changed.

In the mobile terminal, the operation of determining whether or not the ambient brightness change value and the rotation angle change value monitored by the mobile terminal are respectively smaller than the preset brightness and the preset angle further comprises:

setting the preset brightness and the preset angle through the mobile terminal in advance; and determining whether or not the ambient brightness change value monitored by the light sensor is smaller than the preset brightness, and determining whether or not the rotation angle change value monitored by the acceleration sensor is smaller than the preset angle at the same time.

In the mobile terminal, the operation of controlling the display brightness of the mobile terminal unchanged when both the ambient brightness change value and the rotation angle change value are respectively smaller than the preset brightness and the preset angle further comprises:

sending an instruction for prohibiting brightness adjustment to a background of the mobile terminal when the mobile terminal determines that the ambient brightness change value is smaller than the preset brightness and the rotation angle change value is smaller than the preset angle; and controlling the display brightness of the mobile terminal unchanged by the background of the mobile terminal according to the received instruction for prohibiting brightness adjustment.

Still another aspect of the embodiment of the present disclosure provides a memory device. The memory device stores a computer program. The computer program is executable by the processor to implement the operations of:

controlling a light sensor and an acceleration sensor in the mobile terminal in advance to respectively monitor an ambient brightness change value and a rotation angle change value in real time;

determining whether or not the ambient brightness change value and the rotation angle change value monitored by the mobile terminal are respectively smaller than a preset brightness and a preset angle; and controlling the display brightness of the mobile terminal unchanged when both the ambient brightness change value and the rotation angle change value are respectively smaller than the preset brightness and the preset angle.

In the memory device, after the operation of determining whether or not the ambient brightness change value and the rotation angle change value monitored by the mobile terminal are respectively smaller than the preset brightness and the preset angle, the operations further comprises:

controlling the mobile terminal to automatically adjust the display brightness when both the ambient brightness change value and the rotation angle change value are respectively greater than or equal to the preset brightness and the preset angle.

In the memory device, the operation of controlling the light sensor and the acceleration sensor in the mobile terminal in advance to respectively monitor the ambient brightness change value and the rotation angle change value in real time further comprises:

turning on the light sensor in the mobile terminal to monitor ambient brightness in real time, and turning on the acceleration sensor to monitor a rotation angle in real time at the same time;

respectively monitoring the ambient brightness and the rotation angle after a position of the mobile terminal is changed through the light sensor and the acceleration sensor after the position of the mobile terminal is changed; and calculating the ambient brightness change value and the rotation angle change value of the mobile terminal by the mobile terminal based on the ambient brightness and the rotation angle after the position is changed.

In the memory device, the operation of determining whether or not the ambient brightness change value and the rotation angle change value monitored by the mobile terminal are respectively smaller than the preset brightness and the preset angle further comprises:

setting the preset brightness and the preset angle through the mobile terminal in advance; and determining whether or not the ambient brightness change value monitored by the light sensor is smaller than the preset brightness, and determining whether or not the rotation angle change value monitored by the acceleration sensor is smaller than the preset angle at the same time.

In the memory device, the operation of controlling the display brightness of the mobile terminal unchanged when both the ambient brightness change value and the rotation angle change value are respectively smaller than the preset brightness and the preset angle further comprises:

sending an instruction for prohibiting brightness adjustment to a background of the mobile terminal when the mobile terminal determines that the ambient brightness change value is smaller than the preset brightness and the rotation angle change value is smaller than the preset angle; and controlling the display brightness of the mobile terminal unchanged by the background of the mobile terminal according to the received instruction for prohibiting brightness adjustment.

The present disclosure provides a method for controlling display brightness of a mobile terminal, a mobile terminal and a storage device. The method comprises: controlling a light sensor and an acceleration sensor in the mobile terminal in advance to respectively monitor an ambient brightness change value and a rotation angle change value in real time; determining whether or not the ambient brightness change value and the rotation angle change value monitored by the mobile terminal are respectively smaller than a preset brightness and a preset angle; and controlling the display brightness of the mobile terminal unchanged when both the ambient brightness change value and the rotation angle change value are respectively smaller than the preset brightness and the preset angle. The present disclosure combines the light sensor and the acceleration sensor to control the display brightness of the mobile terminal. The problem that the mobile terminal adjusts the display brightness in real time caused by a misoperation is avoided to improve the intelligence of brightness adjustment of the mobile terminal.

DESCRIPTION OF SPECIFIC EMBODIMENTS OF THE INVENTION

These and other features, aspects and advantages of the present disclosure will become understood with reference to the following description, appended claims and accompanying figures.

Figure 1:
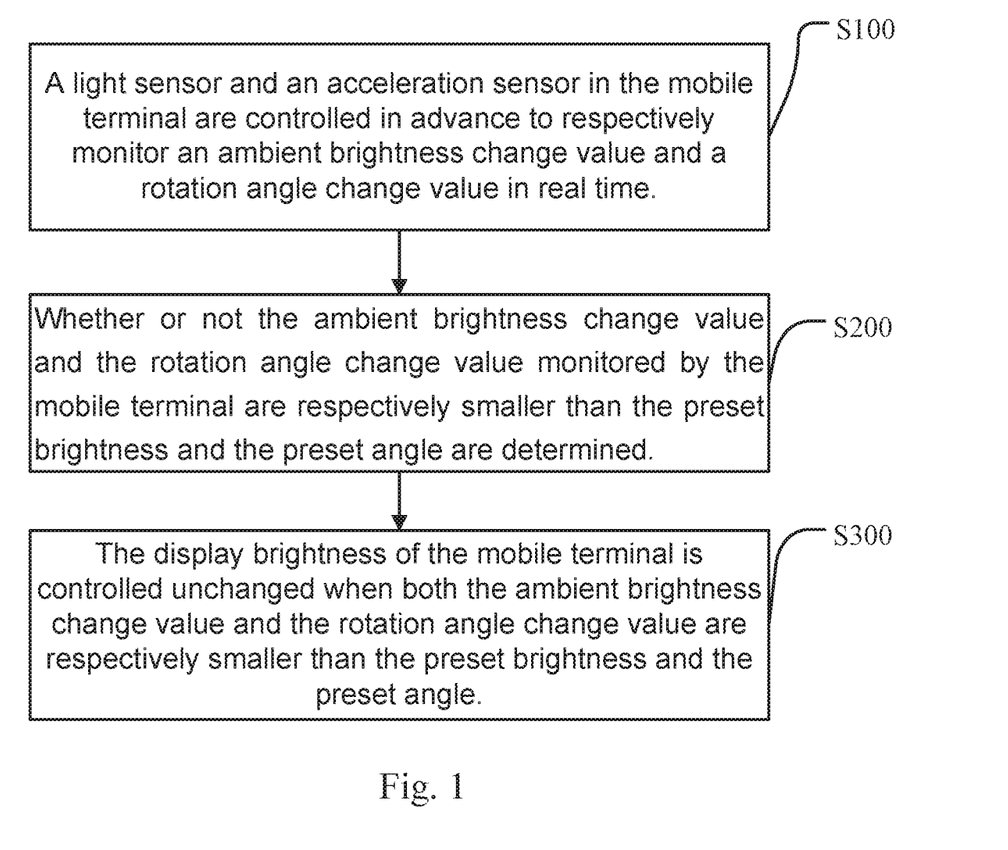
FIG. 1 is a flowchart of a method for controlling display brightness of a mobile terminal according to a preferred embodiment of the present disclosure.

As shown in FIG. 1, a method for controlling display brightness of a mobile terminal according to a preferred embodiment of the present disclosure comprises the following steps:

Step S100: A light sensor and an acceleration sensor in the mobile terminal are controlled in advance to respectively monitor an ambient brightness change value and a rotation angle change value in real time.

Before step S100, the method further comprises: A brightness adjustment state is set to automatically adjusting the display brightness through the mobile terminal, so that the mobile terminal can automatically adjust the display brightness of a display screen based on an ambient brightness change. However, according to the present disclosure, certain conditions need to be satisfied before the brightness adjustment is performed automatically to avoid that the mobile terminal continuously adjusts the display brightness due to a misoperation of the mobile terminal.

Step S100 comprises the following steps:

Step S101: The light sensor in the mobile terminal is turned on to monitor ambient brightness in real time, and the acceleration sensor is turned on at the same time to monitor a rotation angle in real time.

Step S102: After a position of the mobile terminal is changed, the ambient brightness and the rotation angle after the position of the mobile terminal is changed are respectively monitored through the light sensor and the acceleration sensor.

Step S103: The ambient brightness change value and the rotation angle change value of the mobile terminal are calculated by the mobile terminal based on the ambient brightness and the rotation angle after the position is changed.

In greater detail, preset brightness is 200 cd/m2. The brightness refers to the brightness of the picture, measured in the unit of candela per square meter (cd/m2). A preset angle is 40 degrees. Some other brightness values and angle values may be set based on some other situations.

Step S200: Whether or not the ambient brightness change value and the rotation angle change value monitored by the mobile terminal are respectively smaller than the preset brightness and the preset angle are determined.

Step S200 comprises the following steps:

Step S201: The preset brightness and the preset angle are set through the mobile terminal in advance.

Step S202: Whether or not the ambient brightness change value monitored by the light sensor is smaller than the preset brightness is determined, and at the same time whether or not the rotation angle change value monitored by the acceleration sensor is smaller than the preset angle is determined.

In the present disclosure, it is necessary to simultaneously determine whether or not the ambient brightness change value and the rotation angle change value monitored by the mobile terminal are respectively smaller than the preset brightness and the preset angle. Only when these two conditions are simultaneously satisfied can step S300 be performed.

Step S300: The display brightness of the mobile terminal is controlled unchanged when both the ambient brightness change value and the rotation angle change value are respectively smaller than the preset brightness and the preset angle.

In addition, the mobile terminal is controlled to automatically adjust the display brightness when both the ambient brightness change value and the rotation angle change value are respectively greater than or equal to the preset brightness and the preset angle.

Step S300 comprises the following steps:

Step S301: An instruction for prohibiting brightness adjustment is sent to a background of the mobile terminal when the mobile terminal determines that the ambient brightness change value is smaller than the preset brightness and the rotation angle change value is smaller than the preset angle.

Step S302: The display brightness of the mobile terminal is controlled unchanged by the background of the mobile terminal according to the received instruction for prohibiting brightness adjustment.

The present disclosure proposes to cooperate a G-sensor (acceleration sensor) with an L-sensor (light sensor) to solve the problem that the misoperation of the L-Sensor (light sensor) adjusts the display brightness of mobile terminal when the mobile terminal rotates at different angles. The G-sensor (acceleration sensor) can identify the rotation angle of the mobile terminal. When the rotation angle of the mobile terminal is smaller than 40° and the brightness change obtained by the L-sensor (light sensor) is smaller than 200 cd/m2, the display brightness of the mobile terminal is not adjusted at this time. This solves the problem that the display brightness of the mobile terminal is adjusted due to the misoperation of the L-Sensor (light sensor).

Figure 2:
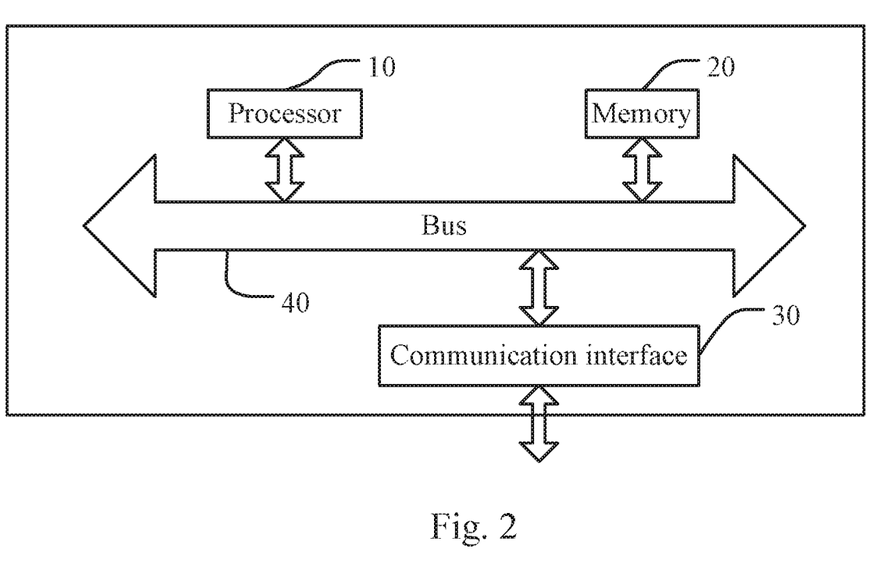
FIG. 2 is a functional block diagram of a mobile terminal according to the present disclosure.

The present disclosure further provides a mobile terminal. As shown in FIG. 2, the mobile terminal comprises a processor 10, a memory 20, a communication interface 30 and a communication bus 40.

The processor 10, the memory 20, and the communication interface 30 complete communications with one another through the communication bus 40.

The communication interface 30 is configured to transmit information between the mobile terminal and communication devices.

The processor 10 is configured to call a computer program in the memory 20 to execute the method provided by the above various method embodiments, which includes, for example: controlling a light sensor and an acceleration sensor in the mobile terminal in advance to respectively monitor an ambient brightness change value and a rotation angle change value in real time; determining whether or not the ambient brightness change value and the rotation angle change value monitored by the mobile terminal are respectively smaller than a preset brightness and a preset angle; and controlling display brightness of the mobile terminal unchanged when both the ambient brightness change value and the rotation angle change value are respectively smaller than the preset brightness and the preset angle.

Figure 3:
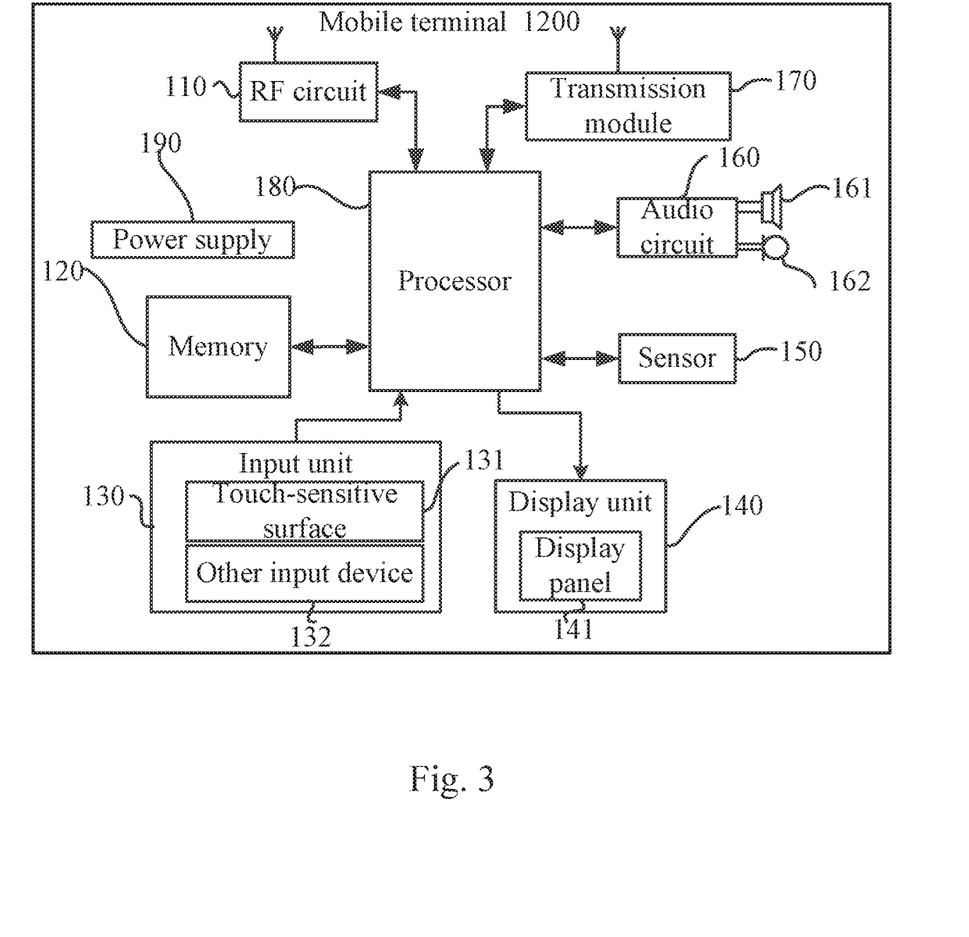
FIG. 3 is a schematic diagram of a detailed structure of a mobile terminal according to one embodiment of the present disclosure.

FIG. 3 depicts a block diagram of a detailed structure of a mobile terminal 1200 according to one embodiment of the present disclosure. The mobile terminal 1200 can be used to perform the method for controlling the display brightness of the mobile terminal provided by the above embodiment. The mobile terminal 1200 may be a smart phone or a tablet computer.

As shown in FIG. 3, the mobile terminal 1200 may comprise components, such as a radio frequency (RF) circuit 110, a memory 120 including one or more (only one is shown in the figure) computer-readable storage media, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 1200 is not limited to the structure of the mobile terminal 1200 shown in FIG. 3. The mobile terminal 1200 may comprise more or less components than those illustrated in the figure, or some components may be combined, or the mobile terminal 1200 may have different component arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 3, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

The mobile terminal 1200 may further comprise a camera (such as a front camera, a rear camera), a Bluetooth module, and the like, and a description in this regard is not provided. In greater detail, a display unit of the mobile terminal is a touch screen display according to the present embodiment. The mobile terminal further comprises a memory and one or more programs. The one or one or more programs are stored in the memory, and are configured to be executed by one or more processors to perform operations of:

controlling a light sensor and an acceleration sensor in the mobile terminal in advance to respectively monitor an ambient brightness change value and a rotation angle change value in real time;

determining whether or not the ambient brightness change value and the rotation angle change value monitored by the mobile terminal are respectively smaller than a preset brightness and a preset angle;

controlling the display brightness of the mobile terminal unchanged when both the ambient brightness change value and the rotation angle change value are respectively smaller than the preset brightness and the preset angle; and controlling the mobile terminal to automatically adjust the display brightness when both the ambient brightness change value and the rotation angle change value are respectively greater than or equal to the preset brightness and the preset angle.

In the mobile terminal, before the step of controlling the light sensor and the acceleration sensor in the mobile terminal in advance to respectively monitor the ambient brightness change value and the rotation angle change value in real time the operations further comprises:

setting a brightness adjustment state to automatically adjusting the display brightness through the mobile terminal.

In the mobile terminal, the preset brightness is 200 cd/m2.

In the mobile terminal, the preset angle is 40 degrees.

In the mobile terminal, the operation of controlling the light sensor and the acceleration sensor in the mobile terminal in advance to respectively monitor the ambient brightness change value and the rotation angle change value in real time further comprises:

turning on the light sensor in the mobile terminal to monitor ambient brightness in real time, and turning on the acceleration sensor to monitor a rotation angle in real time at the same time;

respectively monitoring the ambient brightness and the rotation angle after a position of the mobile terminal is changed through the light sensor and the acceleration sensor after the position of the mobile terminal is changed; and calculating the ambient brightness change value and the rotation angle change value of the mobile terminal by the mobile terminal based on the ambient brightness and the rotation angle after the position is changed.

In the mobile terminal, the operation of determining whether or not the ambient brightness change value and the rotation angle change value monitored by the mobile terminal are respectively smaller than the preset brightness and the preset angle further comprises:

setting the preset brightness and the preset angle through the mobile terminal in advance; and determining whether or not the ambient brightness change value monitored by the light sensor is smaller than the preset brightness, and determining whether or not the rotation angle change value monitored by the acceleration sensor is smaller than the preset angle at the same time.

In the mobile terminal, the operation of controlling the display brightness of the mobile terminal unchanged when both the ambient brightness change value and the rotation angle change value are respectively smaller than the preset brightness and the preset angle further comprises:

sending an instruction for prohibiting brightness adjustment to a background of the mobile terminal when the mobile terminal determines that the ambient brightness change value is smaller than the preset brightness and the rotation angle change value is smaller than the preset angle; and controlling the display brightness of the mobile terminal unchanged by the background of the mobile terminal according to the received instruction for prohibiting brightness adjustment.

The present disclosure further provides a storage device. The storage device stores a computer program. The computer program can be executed to implement the method for controlling the display brightness of the mobile terminal.

In summary, the present disclosure provides a method for controlling display brightness of a mobile terminal, a mobile terminal and a storage device. The method comprises: controlling a light sensor and an acceleration sensor in the mobile terminal in advance to respectively monitor an ambient brightness change value and a rotation angle change value in real time; determining whether or not the ambient brightness change value and the rotation angle change value monitored by the mobile terminal are respectively smaller than a preset brightness and a preset angle; and controlling the display brightness of the mobile terminal unchanged when both the ambient brightness change value and the rotation angle change value are respectively smaller than the preset brightness and the preset angle. The present disclosure combines the light sensor and the acceleration sensor to control the display brightness of the mobile terminal. The problem that the mobile terminal adjusts the display brightness in real time caused by a misoperation is avoided to improve the intelligence of brightness adjustment of the mobile terminal.

Please note, one or more steps of the above-mentioned full visual navigation method could be achieved by instructing related hardware components (such as processor or controllers) through one or more programs. The above-mentioned programs could be stored in a computer readable storage medium such as a memory, a hard disk, an optical disk or etc.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for controlling display brightness of a mobile terminal comprising:

turning on a light sensor in the mobile terminal to monitor ambient brightness in real time, and turning on a acceleration sensor to monitor a rotation angle in real time at the same time;

respectively monitoring the ambient brightness and the rotation angle after a position of the mobile terminal is changed through the light sensor and the acceleration sensor after the position of the mobile terminal is changed; and calculating an ambient brightness change value and a rotation angle change value of the mobile terminal by the mobile terminal based on the ambient brightness and the rotation angle after the position is changed;

determining whether or not the ambient brightness change value and the rotation angle change value monitored by the mobile terminal are respectively smaller than a preset brightness and a preset angle; and controlling the display brightness of the mobile terminal unchanged when both the ambient brightness change value and the rotation angle change value are respectively smaller than the preset brightness and the preset angle.

2. The method as claimed in claim 1, wherein before the step of controlling the light sensor and the acceleration sensor in the mobile terminal in advance to respectively monitor the ambient brightness change value and the rotation angle change value in real time the method further comprises:

setting a brightness adjustment state to automatically adjusting the display brightness through the mobile terminal.

3. The method as claimed in claim 1, wherein after the step of determining whether or not the ambient brightness change value and the rotation angle change value monitored by the mobile terminal are respectively smaller than the preset brightness and the preset angle the method further comprises:

controlling the mobile terminal to automatically adjust the display brightness when both the ambient brightness change value and the rotation angle change value are respectively greater than or equal to the preset brightness and the preset angle.

4. The method as claimed in claim 1, wherein the preset brightness is 200 cd/m$^2$.

5. The method as claimed in claim 1, wherein the preset angle is 40 degrees.

6. The method as claimed in claim 1, wherein the step of determining whether or not the ambient brightness change value and the rotation angle change value monitored by the mobile terminal are respectively smaller than the preset brightness and the preset angle further comprises:

setting the preset brightness and the preset angle through the mobile terminal in advance; and determining whether or not the ambient brightness change value monitored by the light sensor is smaller than the preset brightness, and determining whether or not the rotation angle change value monitored by the acceleration sensor is smaller than the preset angle at the same time.

7. The method as claimed in claim 6, wherein the step of controlling the display brightness of the mobile terminal unchanged when both the ambient brightness change value and the rotation angle change value are respectively smaller than the preset brightness and the preset angle further comprises:
  sending an instruction for prohibiting brightness adjustment to a background of the mobile terminal when the mobile terminal determines that the ambient brightness change value is smaller than the preset brightness and the rotation angle change value is smaller than the preset angle; and
  controlling the display brightness of the mobile terminal unchanged by the background of the mobile terminal according to the received instruction for prohibiting brightness adjustment.

8. A mobile terminal comprising a processor, a memory communicatively connected to the processor, the memory storing a computer program, the processor being configured to call the computer program in the memory to implement operations of:
  turning on a light sensor in the mobile terminal to monitor ambient brightness in real time, and turning on a acceleration sensor to monitor a rotation angle in real time at the same time;
  respectively monitoring the ambient brightness and the rotation angle after a position of the mobile terminal is changed through the light sensor and the acceleration sensor after the position of the mobile terminal is changed; and
  calculating an ambient brightness change value and a rotation angle change value of the mobile terminal by the mobile terminal based on the ambient brightness and the rotation angle after the position is changed;
  determining whether or not the ambient brightness change value and the rotation angle change value monitored by the mobile terminal are respectively smaller than a preset brightness and a preset angle;
  controlling the display brightness of the mobile terminal unchanged when both the ambient brightness change value and the rotation angle change value are respectively smaller than the preset brightness and the preset angle; and
  controlling the mobile terminal to automatically adjust the display brightness when both the ambient brightness change value and the rotation angle change value are respectively greater than or equal to the preset brightness and the preset angle.

9. The mobile terminal as claimed in claim 8, wherein before the operation of controlling the light sensor and the acceleration sensor in the mobile terminal in advance to respectively monitor the ambient brightness change value and the rotation angle change value in real time the operations further comprises:
  setting a brightness adjustment state to automatically adjusting the display brightness through the mobile terminal.

10. The mobile terminal as claimed in claim 8, wherein the preset brightness is 200 $cd/m^2$.

11. The mobile terminal as claimed in claim 8, wherein the preset angle is 40 degrees.

12. The mobile terminal as claimed in claim 8, wherein the operation of determining whether or not the ambient brightness change value and the rotation angle change value monitored by the mobile terminal are respectively smaller than the preset brightness and the preset angle further comprises:
  setting the preset brightness and the preset angle through the mobile terminal in advance; and
  determining whether or not the ambient brightness change value monitored by the light sensor is smaller than the preset brightness, and determining whether or not the rotation angle change value monitored by the acceleration sensor is smaller than the preset angle at the same time.

13. The mobile terminal as claimed in claim 12, wherein the operation of controlling the display brightness of the mobile terminal unchanged when both the ambient brightness change value and the rotation angle change value are respectively smaller than the preset brightness and the preset angle further comprises:
  sending an instruction for prohibiting brightness adjustment to a background of the mobile terminal when the mobile terminal determines that the ambient brightness change value is smaller than the preset brightness and the rotation angle change value is smaller than the preset angle; and
  controlling the display brightness of the mobile terminal unchanged by the background of the mobile terminal according to the received instruction for prohibiting brightness adjustment.

14. A memory device storing a computer program, the computer program being executable to implement operations of:
  turning on a light sensor in the mobile terminal to monitor ambient brightness in real time, and turning on a acceleration sensor to monitor a rotation angle in real time at the same time;
  respectively monitoring the ambient brightness and the rotation angle after a position of the mobile terminal is changed through the light sensor and the acceleration sensor after the position of the mobile terminal is changed; and
  calculating an ambient brightness change value and a rotation angle change value of the mobile terminal by the mobile terminal based on the ambient brightness and the rotation angle after the position is changed;
  determining whether or not the ambient brightness change value and the rotation angle change value monitored by the mobile terminal are respectively smaller than a preset brightness and a preset angle; and
  controlling the display brightness of the mobile terminal unchanged when both the ambient brightness change value and the rotation angle change value are respectively smaller than the preset brightness and the preset angle.

15. The memory device as claimed in claim 14, wherein after the operation of determining whether or not the ambient brightness change value and the rotation angle change value monitored by the mobile terminal are respectively smaller than the preset brightness and the preset angle, the operations further comprises:
  controlling the mobile terminal to automatically adjust the display brightness when both the ambient brightness change value and the rotation angle change value are respectively greater than or equal to the preset brightness and the preset angle.

16. The memory device as claimed in claim 14, wherein the operation of determining whether or not the ambient brightness change value and the rotation angle change value monitored by the mobile terminal are respectively smaller than the preset brightness and the preset angle further comprises:

setting the preset brightness and the preset angle through the mobile terminal in advance; and determining whether or not the ambient brightness change value monitored by the light sensor is smaller than the preset brightness, and determining whether or not the rotation angle change value monitored by the acceleration sensor is smaller than the preset angle at the same time.

17. The memory device as claimed in claim 16, wherein the operation of controlling the display brightness of the mobile terminal unchanged when both the ambient brightness change value and the rotation angle change value are respectively smaller than the preset brightness and the preset angle further comprises:

sending an instruction for prohibiting brightness adjustment to a background of the mobile terminal when the mobile terminal determines that the ambient brightness change value is smaller than the preset brightness and the rotation angle change value is smaller than the preset angle; and controlling the display brightness of the mobile terminal unchanged by the background of the mobile terminal according to the received instruction for prohibiting brightness adjustment.

\* \* \* \* \*